United States Patent [19]
Thibaud

[11] Patent Number: 5,200,698
[45] Date of Patent: Apr. 6, 1993

[54] SYSTEM FOR SENSING THE POSITION OF A ROTATING STEEL SHAFT INCLUDING A TRACK FORMED BY A STRIP HAVING DISCONTINUOUS ELECTRICAL PROPERTIES, AND A METHOD OF MANUFACTURING SUCH A TRACK

[75] Inventor: Marc Thibaud, Soisy sous Montmorency, France

[73] Assignee: Gec Alsthom SA, Paris, France

[21] Appl. No.: 465,862

[22] Filed: Jan. 16, 1990

[30] Foreign Application Priority Data

Jan. 17, 1989 [FR] France .................. 89 00492

[51] Int. Cl.$^5$ .............. G01B 7/30; G01P 3/49
[52] U.S. Cl. .............. 324/207.22; 29/592.1; 156/292; 324/164; 324/173
[58] Field of Search .......... 324/164, 173, 174, 207.16, 324/207.22, 207.25; 341/15; 340/671, 672, 686; 29/592.1; 156/60, 292, 307.7

[56] References Cited

U.S. PATENT DOCUMENTS

| | | |
|---|---|---|
| 3,243,692 | 3/1966 | Heissmeier et al. ............ 324/174 X |
| 4,107,601 | 8/1978 | Barmeier, Jr. et al. ............ 324/173 |
| 4,764,767 | 8/1988 | Ichikawa et al. .......... 324/207.22 X |

FOREIGN PATENT DOCUMENTS

| | | |
|---|---|---|
| 0108950 | 5/1984 | European Pat. Off. . |
| 3109586 | 9/1982 | Fed. Rep. of Germany . |
| WO8804408 | 6/1988 | PCT Int'l Appl. . |
| 2065897 | 7/1981 | United Kingdom . |

*Primary Examiner*—Gerard R. Strecker

[57] ABSTRACT

A system for sensing the position of a rotating steel shaft (1), the system comprising an eddy current sensor and a track (3) fixed to the shaft and going past the sensor, the track being constituted by a strip (4) of electrical insulation material having areas of non-ferromagnetic material with good electrical conductivity regularly distributed around the shaft, wherein the face of the strip (4) provided with the areas of non-ferromagnetic material is glued to the shaft (1). This very simple system serves to obtain a signal of larger amplitude.

3 Claims, 1 Drawing Sheet

SYSTEM FOR SENSING THE POSITION OF A ROTATING STEEL SHAFT INCLUDING A TRACK FORMED BY A STRIP HAVING DISCONTINUOUS ELECTRICAL PROPERTIES, AND A METHOD OF MANUFACTURING SUCH A TRACK

The present invention relates to a system for sensing the position of a rotating steel shaft, the system including an eddy current sensor and a track fixed to the shaft and running past the sensor, the track including discontinuities which are sensed by the sensor.

BACKGROUND OF THE INVENTION

A known track comprises geometrical discontinuities formed on the periphery of the shaft (holes, fluting, studs).

However, it is expensive to machine such discontinuities.

It is also known (DE-A-3 109 586) to use a track fixed to the shaft and constituted by a strip of electrical insulation material including areas of non-ferromagnetic material having good electrical conductivity, said areas being regularly distributed around the shaft.

In the prior system, the areas of non-ferromagnetic material are disposed on the electrical insulating material strip facing away from the shaft.

SUMMARY OF THE INVENTION

The inventor has observed that by placing the areas of non-ferromagnetic material facing the shaft, i.e. by disposing them as close as possible to the steel shaft, the signal is increased.

In addition, the electrical insulating material strip then protects the areas of non-ferromagnetic material.

The invention also relates to a method of manufacturing a track having areas of non-ferromagnetic material on a steel shaft. A strip provided with regularly distributed areas of non-ferromagnetic material is made and is glued to the shaft with its areas of non-ferromagnetic material facing the shaft.

BRIEF DESCRIPTION OF THE DRAWING

An embodiment of the invention is described by way of example with reference to the accompanying drawing, in which.

DETAILED DESCRIPTION

Figure 1:
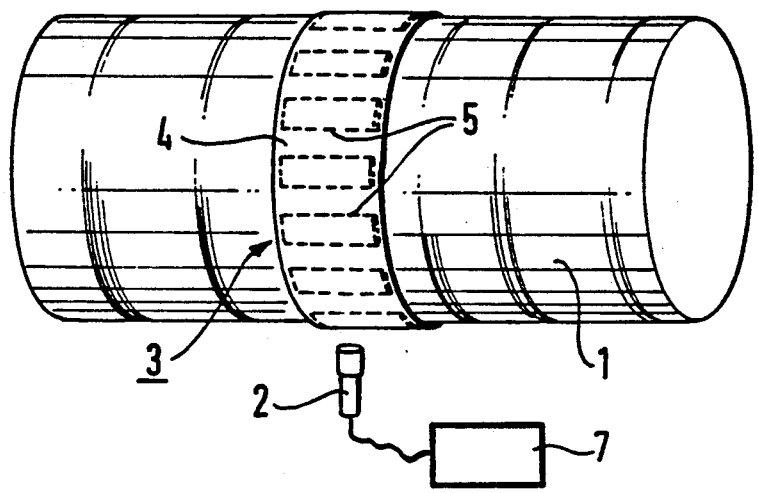
FIG. 1 shows a sensing system of the invention.
Figure 2:
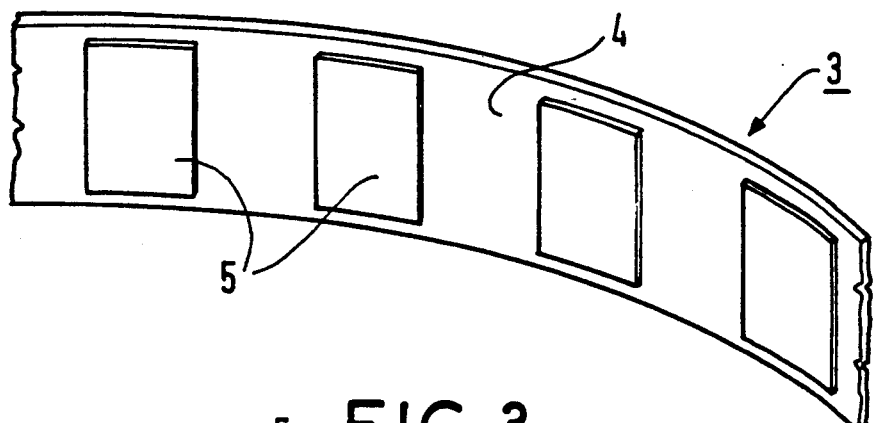
FIG. 2 shows a strip suitable for making the strip of the invention.
Figure 3:
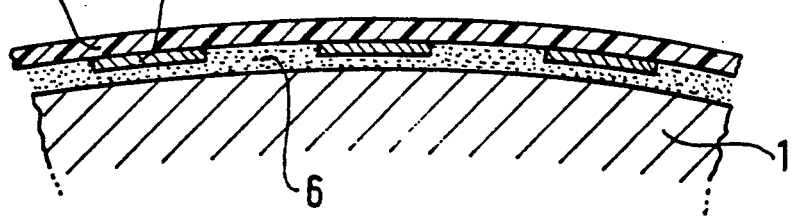
FIG. 3 shows the track of FIG. 2 glued on the shaft.

The sensing system (FIG. 1) for sensing the position of a steel shaft 1 comprises an eddy current sensor 2 and a track 3 running past the sensor and constituted by a strip 4 provided with rectangular areas 5 of non-ferromagnetic material, preferably copper, uniformly distributed around the shaft 1.

The strip 4 is constituted by a 0.3 mm thick laminated epoxy medium on which a 70 micron thick layer of copper is deposited. Parts of the copper layer are removed by electroerosion so as to leave only the copper areas 5 remaining.

The strip 4 is glued onto the shaft 1 with its areas 5 adjacent to the shaft. The glue 6 is selected so that the strip 4 has good mechanical performance relative to centrifugal and tangential forces. An epoxy glue is used which is capable of withstanding the environment of the shaft (water, oil, temperature).

The copper areas 5 are protected by the laminated layer 4.

Figure 4:
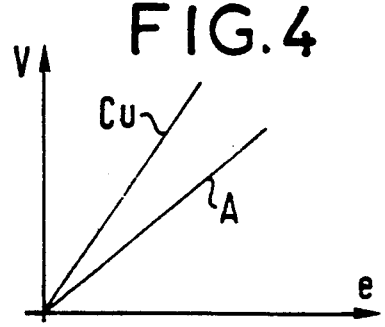
FIG. 4 is a graph of eddy current sensor response curves in the presence of copper and of steel.

FIG. 4 shows the electrical voltage obtained at the output from the eddy current sensor when using steel (A) and when using copper (Cu), and plotted as a function of the distance e between the metal and the sensor. The response curve with copper gives a clearly greater response than with steel. Since the copper areas are very close to the steel and isolated from the steel shaft they may be considered as being as substantially the same distance from the sensor so that a large voltage step is produced when the copper areas go past the sensor.

These voltage steps are detected in conventional apparatus 7 and serve to sense the position of the shaft 1. The signal can then be used, in particular for measuring the angle of the shaft and/or its speed.

I claim:

1. A system for sensing the position of a rotating steel shaft, the system comprising an eddy current sensor and a track fixed to the shaft and going past the sensor, the track being constituted by a strip of electrical insulation material having areas of non-ferromagnetic material with good electrical conductivity regularly distributed around the shaft, wherein the face of the strip provided with the areas of non-ferromagnetic material is glued close to the shaft and isolated from the shaft.

2. A sensing system according to claim 1, wherein the areas are made of copper.

3. A method of manufacturing a track having areas of non-ferromagnetic metal material on a steel shaft, said track being adapted for use in determining the rotational position of said shaft by sensing the metal areas, said method comprising the steps of: forming a strip of electrical insulating material having regularly distributed areas of non-ferromagnetic metal on one face thereof, and gluing said strip to the periphery of said shaft with the areas of non-ferromagnetic metal facing the shaft and isolated therefrom by said glue.

* * * * *